(12) United States Patent
Verhoog et al.

(10) Patent No.: US 10,233,996 B2
(45) Date of Patent: Mar. 19, 2019

(54) PENDULUM DAMPING SYSTEM EQUIPPED WITH SUPPORT MEMBER HAVING RACEWAYS JUXTAPOSED CONTINUOUSLY AROUND ROTATION AXIS

(71) Applicant: VALEO EMBRAYAGES, Amiens (FR)

(72) Inventors: Roel Verhoog, Gournay sur Aronde (FR); Giovanni Grieco, Colombes (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/519,266

(22) PCT Filed: Oct. 7, 2015

(86) PCT No.: PCT/EP2015/073117
§ 371 (c)(1),
(2) Date: Apr. 14, 2017

(87) PCT Pub. No.: WO2016/058880
PCT Pub. Date: Apr. 21, 2016

(65) Prior Publication Data
US 2017/0241509 A1 Aug. 24, 2017

(30) Foreign Application Priority Data
Oct. 17, 2014 (FR) ...................................... 14 59983

(51) Int. Cl.
*F16F 15/14* (2006.01)
(52) U.S. Cl.
CPC ........ *F16F 15/1485* (2013.01); *F16F 15/145* (2013.01)

(58) Field of Classification Search
CPC ...... F16F 15/145; F16F 15/1485; F16F 15/14; F16D 3/12
See application file for complete search history.

(56) References Cited

U.S. PATENT DOCUMENTS 1,315,380 A 9/1919 Martens
10,094,444 B2 * 10/2018 Movlazada ........... F16F 15/145
(Continued)

FOREIGN PATENT DOCUMENTS

DE 102015207738 A1 * 11/2015 ............ F16F 15/145
EP 2703688 A2 3/2014
FR 2989753 A1 10/2013

*Primary Examiner* — Thomas C Diaz
(74) *Attorney, Agent, or Firm* — Berenato & White, LLC (57) ABSTRACT

The invention relates to a vibration damping system for a motor vehicle transmission, comprising:
a support member (1) capable of being driven rotationally around an axis X and having a plurality of outer raceways (16); and
a plurality of pendulum flyweights (2) distributed circumferentially around the axis X;
each of the pendulum flyweights (2) being mounted oscillatingly with respect to the support member (1) by means of two rolling bodies (12, 13) that interact respectively with one and the other of the two inner raceways (14, 15) of the pendulum flyweight (2) and each interact with one of the outer raceways (16) of the support member (1),
the outer raceways (16) being juxtaposed one after another continuously around the axis X, so that the rolling bodies (12, 13) are each capable of passing freely from a first outer raceway (16) to a second outer raceway (16).

22 Claims, 7 Drawing Sheets

(56) References Cited

U.S. PATENT DOCUMENTS

2014/0066216 A1\* 3/2014 Tone ................ F16F 15/145
 464/160
2015/0075320 A1 3/2015 Verhoog \* cited by examiner

PENDULUM DAMPING SYSTEM EQUIPPED WITH SUPPORT MEMBER HAVING RACEWAYS JUXTAPOSED CONTINUOUSLY AROUND ROTATION AXIS

CROSS-REFERENCE TO RELATED APPLICATIONS AND CLAIM TO PRIORITY

This application is a national stage application of International Application No. PCT/EP2015/073117 filed Oct. 7, 2015, which claims priority to French Patent Application No. 1459983 filed Oct. 17, 2014, the disclosures of which are incorporated herein by reference and to which priority is claimed.

FIELD OF THE INVENTION

The invention relates to the field of vibration damping systems of the pendulum oscillator type, intended to be installed on motor vehicle transmissions.

BACKGROUND OF THE INVENTION

A combustion engine exhibits irregularities due to the combustion events occurring sequentially in the engine's cylinders, the frequency of the irregularities varying in particular as a function of the number of cylinders and the rotation speed of the engine. The function of a damping system is to filter the vibrations caused by the irregularities upstream from the gearbox. Otherwise vibrations would enter the gearbox and produce particularly undesirable noise, impacts, and acoustic emissions therein during operation.

Damping systems of the pendulum type, also called "pendulum oscillators" or "pendulums," which are installed in motor vehicle transmissions, are known in the existing art.

One such damping system of the pendulum oscillator type is described, for example, in the document FR 2989753. The damping system has a support member and a plurality of pendulum flyweights mounted oscillatingly with respect to the support member. Each pendulum flyweight is mounted oscillatingly with respect to the support member by means of two rolling bodies that each interact on the one hand with an inner raceway carried by said pendulum flyweight, and on the other hand with an outer raceway facing said inner raceway and carried by the support member.

In a damping system of this kind, the outer raceways are formed in orifices configured in the support member in such a way that the angular deflection of the pendulum flyweights with respect to the support member is necessarily limited. In certain operating conditions, and in particular upon engine starting, the amplitude of the vibrations is such that the pendulum oscillator is saturated and the pendulum flyweights come into abutment against the support member. These operating conditions result, each time, in impacts between the pendulum flyweights and the support member. In order to limit acoustic emissions under such operating conditions, the support member and/or the pendulum flyweights are equipped with abutment elements made of elastomer which limit the deflection of the pendulum flyweights with respect to the support member. Elastomer abutment elements of this kind are subjected, however, to high temperatures and to a large number of impacts. Elastomer abutment elements of this kind thus result in a limitation of the service life of the damping system, and in an increase in the system's cost and complexity.

SUMMARY OF THE INVENTION

An idea on which the invention is based is to provide a simple, economical, and effective solution to these problems.

According to an embodiment, the invention furnishes a vibration damping system for a motor vehicle transmission, comprising:
  a support member capable of being driven rotationally around an axis X and having a plurality of outer raceways; and
  a plurality of pendulum flyweights distributed circumferentially around the axis X and each having two inner raceways that are radially internal with respect to the outer raceways,
  each of the pendulum flyweights being mounted oscillatingly with respect to the support member by means of two rolling bodies that interact respectively with one and the other of the two inner raceways of said pendulum flyweight and each interact with one of the outer raceways of the support member in order to guide the oscillating movement of said pendulum flyweight with respect to said support member;
  said damping system being notable in that the outer raceways are juxtaposed one after another continuously around the axis X so that each rolling body is capable of passing freely from a first outer raceway to a second outer raceway, adjacent to said first outer raceway, when the pendulum flyweights are acted upon by vibrations having an amplitude such that each rolling body of said pendulum flyweights is displaced beyond an end of said first outer raceway.

If the deflection of the pendulum flyweights exceeds the deflection caused by guidance of the rolling bodies on the associated first outer raceways, the rolling bodies of the pendulum flyweights thus pass freely to adjacent outer raceways, so that the deflection of the pendulum flyweights with respect to the support member is not limited, and it is no longer necessary to provide abutment elements made of elastomeric material (which are complex and costly), allowing acoustic emissions to be limited when the pendulum oscillator is subjected to vibrations whose amplitude results in saturation.

According to other advantageous embodiments, a damping system of this kind can have one or more of the following characteristics:
  The two rolling bodies associated with each pendulum flyweight are held on the associated pendulum flyweight.
  The rolling elements are cylindrical rollers that each have at least one end equipped with an axially projecting pin, and each pendulum flyweight has at least one flange, axially bordering the inner raceways of said pendulum flyweight, which is equipped with two grooves each receiving one of said pins.
  The cylindrical rollers have two ends equipped with an axially projecting pin, and each pendulum flyweight has two flanges, arranged on either side of the inner raceways of said pendulum flyweight, which are each equipped with two grooves each receiving one of said pins.
  A functional clearance is provided between each pin and the edges of the groove in which said pin is received, said functional clearance being configured such that the pin does not touch the edges of the groove when the cylindrical roller equipped with said pin interacts with the inner raceway and the outer raceway.

The grooves have an arced shape whose concavity is directed radially inward.

The support member has an external ring and an internal ring which are concentric and coaxial with the axis X and between which the pendulum flyweights extend radially; and the outer raceways are configured in an internal surface of the external ring.

The internal ring is covered with a ring of elastomeric material in order to damp the fall of the pendulum flyweights when the pendulum flyweights are no longer subjected to centrifugal force.

The support member furthermore has two discs extending axially on either side of the internal ring and external ring.

The damping system has axial retention members that are fastened to the pendulum flyweights and are arranged on either side of said pendulum flyweights, each axial retention member being interposed between one of said pendulum flyweights and one of the discs of the support member in order to axially center the pendulum flyweights with respect to the support member.

At least one of the facing circumferential ends of two adjacent pendulum flyweights is equipped with an abutment element made of elastomer.

The pendulum flyweights each have two circumferential ends equipped with an abutment element made of elastomer.

The support member has as many outer raceways as, or more outer raceways than, the damping system has rolling bodies.

The support member has three or four outer raceways per pendulum flyweight.

The outer raceways exhibit a concavity directed outward, and the inner raceways exhibit a concavity directed inward.

The angular sum of the intervals between the pendulum flyweights is less than the angular distance of one outer raceway.

According to an embodiment, the invention also furnishes a motor vehicle having an aforementioned damping system.

BRIEF DESCRIPTION OF THE DRAWINGS

The invention will be better understood, and other objectives, details, characteristics, and advantages thereof will emerge more clearly, in the course of the description below of several specific embodiments of the invention, provided solely for illustrative and not limiting purposes and referring to the attached drawings.

In those drawings.

DETAILED DESCRIPTION OF THE PREFERRED EMBODIMENT(S)

In the description and the claims, the terms "outer" and "inner" and the "axial" and "radial" orientations will be used to designate elements of the damping system in accordance with the definitions given in the description. By convention, the "radial" orientation is directed orthogonally to the rotation axis X of the damping system determining the "axial" orientation; and, moving away from said axis from inside to outside, the "circumferential" orientation is directed orthogonally to the axis of the damping system and orthogonally to the radial direction. The terms "outer" and "inner" are used to define the relative position of one element with respect to another with reference to the axis X of the damping system; an element close to the axis is thus referred to as "inner," as opposed to an "outer" element situated radially at the periphery.

The vibration damping system is intended to be arranged in the transmission drivetrain of a motor vehicle between the combustion engine and the gearbox. It can in particular be incorporated into an engine flywheel, a dual mass flywheel, a clutch mechanism, a bypass clutch of a hydraulic coupling device, or a friction clutch.

Figure 1:
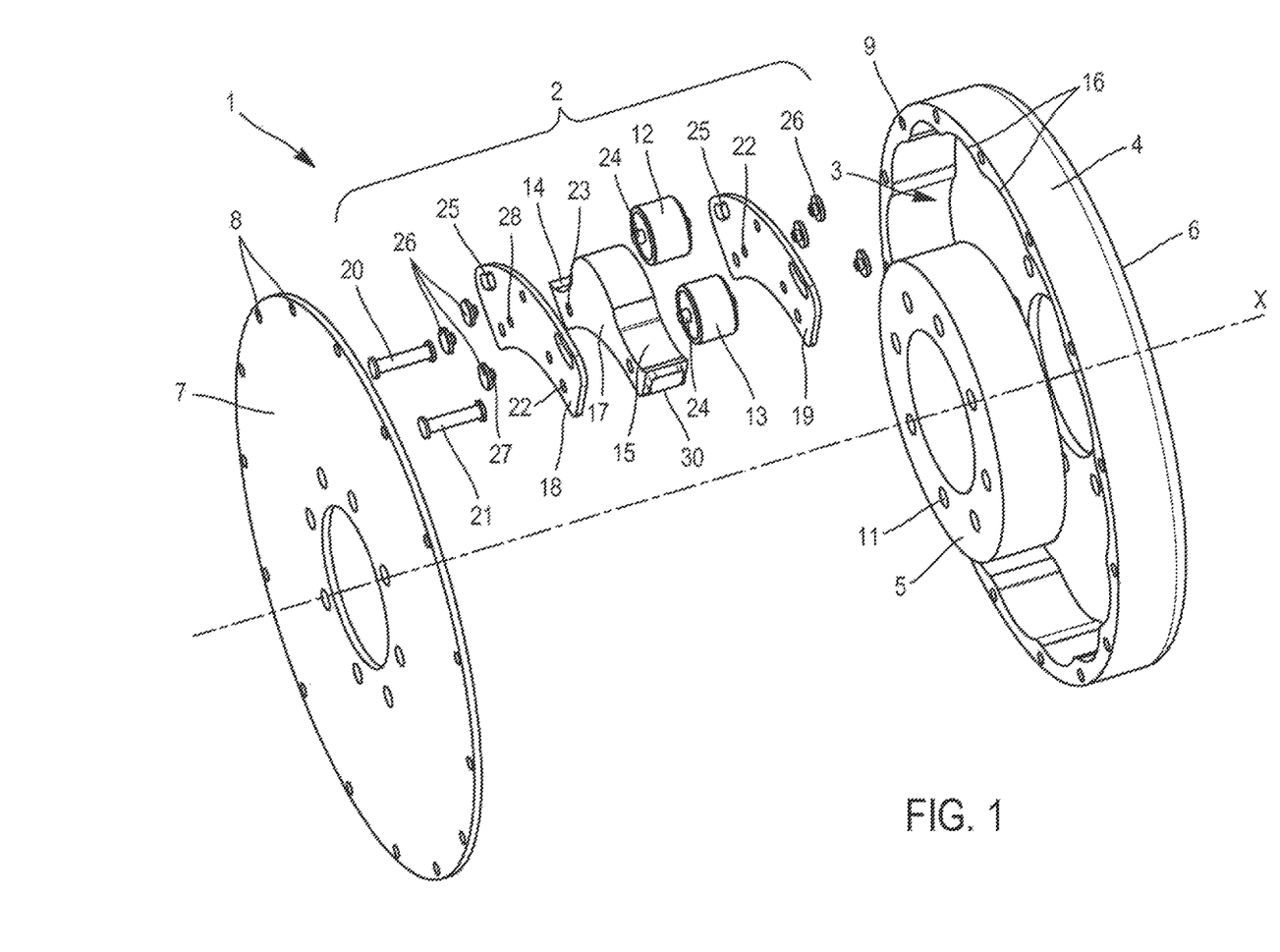
FIG. 1 is an exploded perspective view of a vibration damping system in which a single pendulum flyweight is depicted.

Referring to FIG. 1, it is evident that the damping system has a support member 1 for pendulum flyweights 2 which is capable of being driven rotationally around an axis X. Support member 1 is intended to be rotationally integrated with an element of the drivetrain of a motor vehicle.

Support member 1 defines a closed receiving space 3 inside which pendulum flyweights 2 are received. To do so, support member 1 has an external ring 4, an internal ring 5, and two discs 6, 7. External ring 4 and internal ring 5 are concentric and coaxial with axis X. The two discs 6, 7 extend on either side of external ring 4 and internal ring 5. Receiving space 3 for pendulum flyweights 2 extends axially between the two discs 6, 7 and radially between external ring 4 and internal ring 5.

In the embodiment depicted, one of the discs 6, and external ring 4, are formed from a single one-piece element. Disc 7 and internal ring 5 are integrated with said one-piece element by a first set of external fastening members such as rivets (not depicted), passing through bores 8, 9 configured in disc 7 and in external ring 4, and by a second set of fastening members such as rivets (not illustrated), passing through bores 10, 11 configured in discs 6, 7 and in internal ring 5. Note that according to another embodiment that is not depicted, the two discs 6, 7 are elements that are distinct from external ring 4 and internal ring 5 and are fastened against the axial faces of external ring 4 and internal ring 5 in order to sandwich them.

The pendulum flyweights 2 are mounted oscillatingly with respect to support member 1 along a plane orthogonal to rotation axis X of the damping system. The term "mounted oscillatingly" is defined herein as configured to swing backward and forward like a pendulum, i.e., to swing freely to and fro under the action of gravity. Each of pendulum flyweights 2 is guided with respect to support member 1 by means of two rolling bodies that, in the embodiment depicted, are cylindrical rollers 12, 13 of circular section. In other words, the pendulum flyweights 2 are oscillatingly and circumferentially (i.e., angularly) moveable relative to each other.

Each pendulum flyweight 2 is equipped with two inner raceways 14, 15 interacting respectively with one and the other of the two cylindrical rollers 12, 13. On the other hand, support member 1 is likewise equipped with outer raceways 16 configured in the internal surface of external ring 4. During operation, each cylindrical roller 12, 13 thus interacts with one of inner raceways 14, 15 carried by pendulum flyweight 2 and with an outer raceway 16 facing said inner raceway 14, 15 and carried by support member 1.

Outer raceways 16 have a concavity directed radially outward, while inner raceways 14, 15 have a concavity directed radially inward. Raceways 14, 15, 16 are generally epicycloidal in shape. The geometry of the raceways is determined as a function of the desired tuning order. In general, the tuning order of the pendulum flyweights is such that:

$$n_{mp} \approx \sqrt{R/L} \tag{1}$$

where
 $n_{mp}$=tuning order of the pendulum flyweights;
 L=radius of the circular arc traced by the center of mass of the pendulum flyweight with respect to the support; and
 R=distance separating rotation axis X from the center of the circular arc traced by the center of mass of the pendulum flyweight with respect to the support.

The pendulum flyweights are advantageously tuned to an order having a value close to the order of the predominant harmonics generated by the internal combustion engine. An engine operating with a number of cylinders 2*n generates harmonics principally of order n; the pendulum flyweights are thus tuned to an order $n_{mp}$ equal or similar to the latter.

Figure 3:
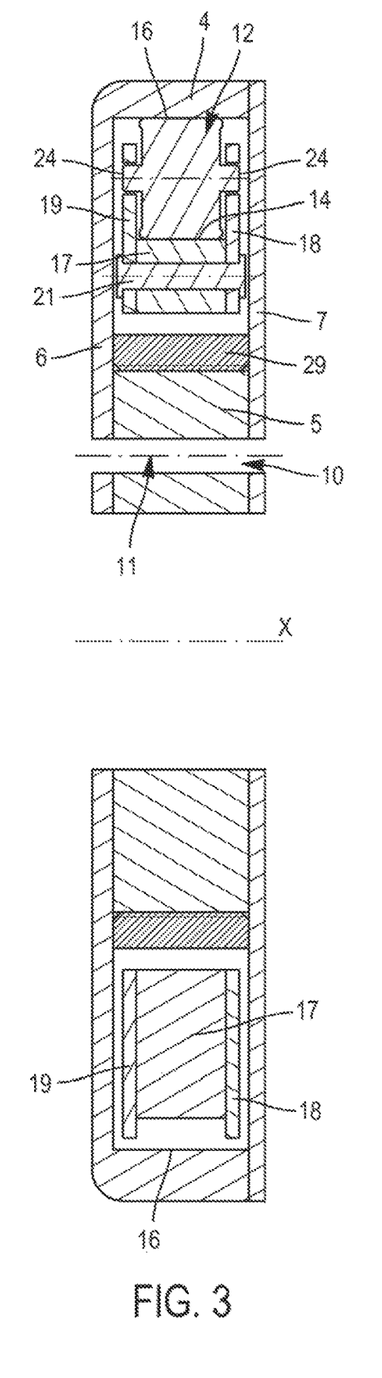
FIG. 3 is a view of the damping system of FIG. 2 in section along III-Ill.
Figure 4:
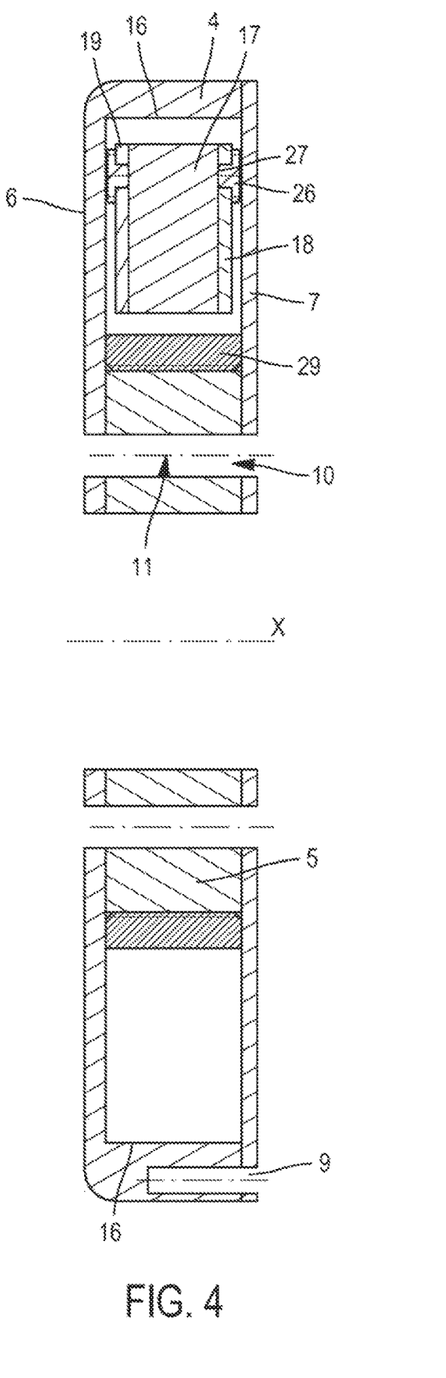
FIG. 4 is a view of the damping system of FIG. 2 in section along the plane IV-IV.
Figure 5:
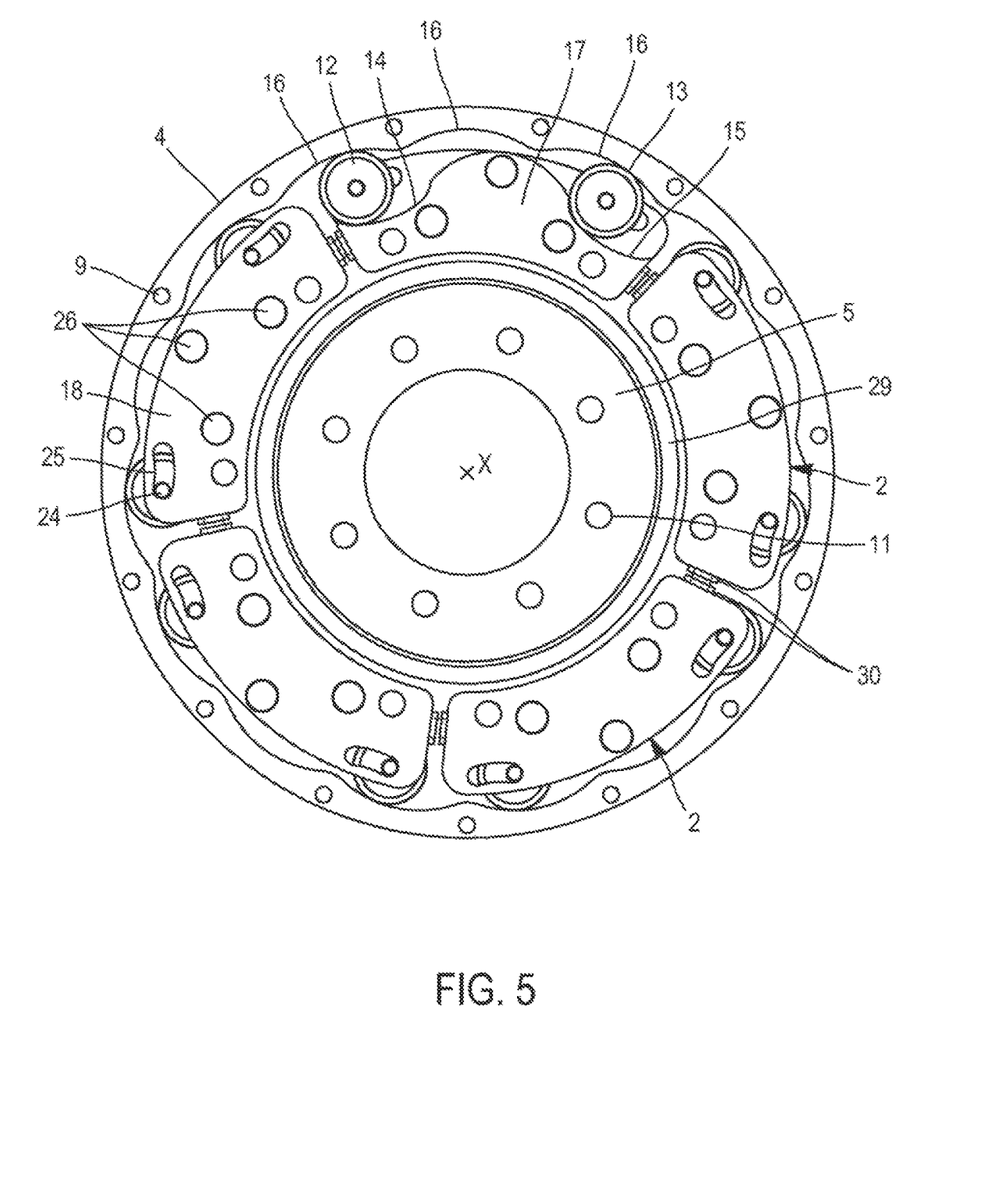
FIG. 5 is a frontal view of the damping system of FIG. 2 in a centrifuged position, one of the lateral flanges of one of the pendulum weights not having been depicted in order to allow observation of the inner raceways carried by said pendulum flyweight.

As depicted in FIG. 1, 3, or 4, each pendulum flyweight 2 has a central element 17 and two flanges 18, 19 arranged axially on either side of central element 17 and configured to ensure integration of the two cylindrical rollers 12, 13 with their respective pendulum flyweight 2. Central element 17 and the two flanges 18, 19 are fastened to one another by means of a pair of rivets 20, 21 passing through bores 22, 23 configured through central element 17 and flanges 18, 19.

Inner raceways 14, 15 are formed on the external periphery of central element 17. Inner raceways 14, 15 can be produced by casting or by machining. Inner raceways 14, 15 can be produced in particular by stamping, milling, or any other suitable machining method.

Each of the ends of cylindrical rollers 12, 13 is equipped with a pin 24 that projects axially. Pins 24 preferably project axially along the revolution axis of cylindrical rollers 12, 13. Flanges 18, 19 are equipped with grooves 25 that receive pins 24 of cylindrical rollers 12, 13, so that cylindrical rollers 12, 13 are captured between flanges 18, 19 as depicted in the upper part of FIG. 3, and are thus integrated with pendulum flyweights 2.

Grooves 25 have an oblong overall shape configured to allow displacement of cylindrical rollers 12, 13 along inner raceways 14, 15. A functional clearance is provided between the edge of grooves 25 and pins 24 so that in normal operation, guidance of the movement of cylindrical rollers 12, 13 with respect to the pendulum flyweight 2 with which they are associated is provided not by guidance of pins 24 inside grooves 25, but by guidance of said cylindrical rollers 12, 13 against inner raceways 14, 15. In the embodiment depicted, grooves 25 have an arced shape whose concavity is directed radially inward. Grooves 25 furthermore are symmetrical pairwise on the one hand with respect to a radial plane of symmetry of each pendulum flyweight, and on the other hand with respect to a plane of symmetry orthogonal to axis X.

Pendulum flyweights 2 are equipped with axial retention members allowing pendulum flyweights 2 to be centered axially with respect to support member 1. The axial retention members are sliders 26 made of polymeric material, depicted in particular in FIGS. 1 and 4 and fastened against flanges 17, 18. Each slider 26 is interposed between one of said flanges 17, 18 and disc 6, 7 of the support member opposite, and thus allows pendulum flyweights 2 to be centered axially with respect to support member 1. Sliders 26 are advantageously made of a polymeric material having a low coefficient of friction. Sliders 26 are equipped with shanks 27 engaged into holes 28 of complementary shape configured in flanges 17, 18.

Figure 2:
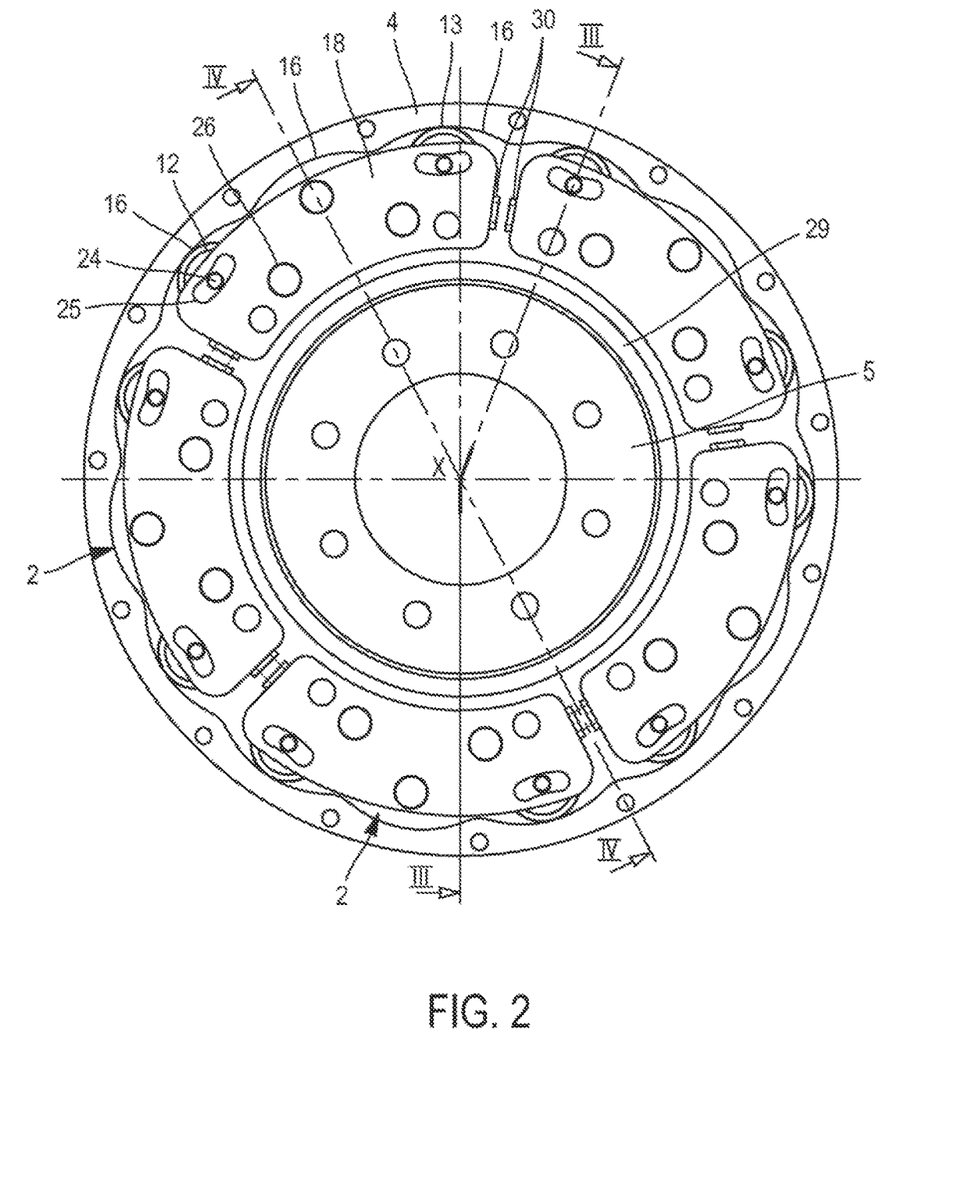
FIG. 2 is a frontal view of a damping system according to FIG. 1, depicting the pendulum flyweights in a middle position when they are being subject to centrifugal force.
Figure 8:
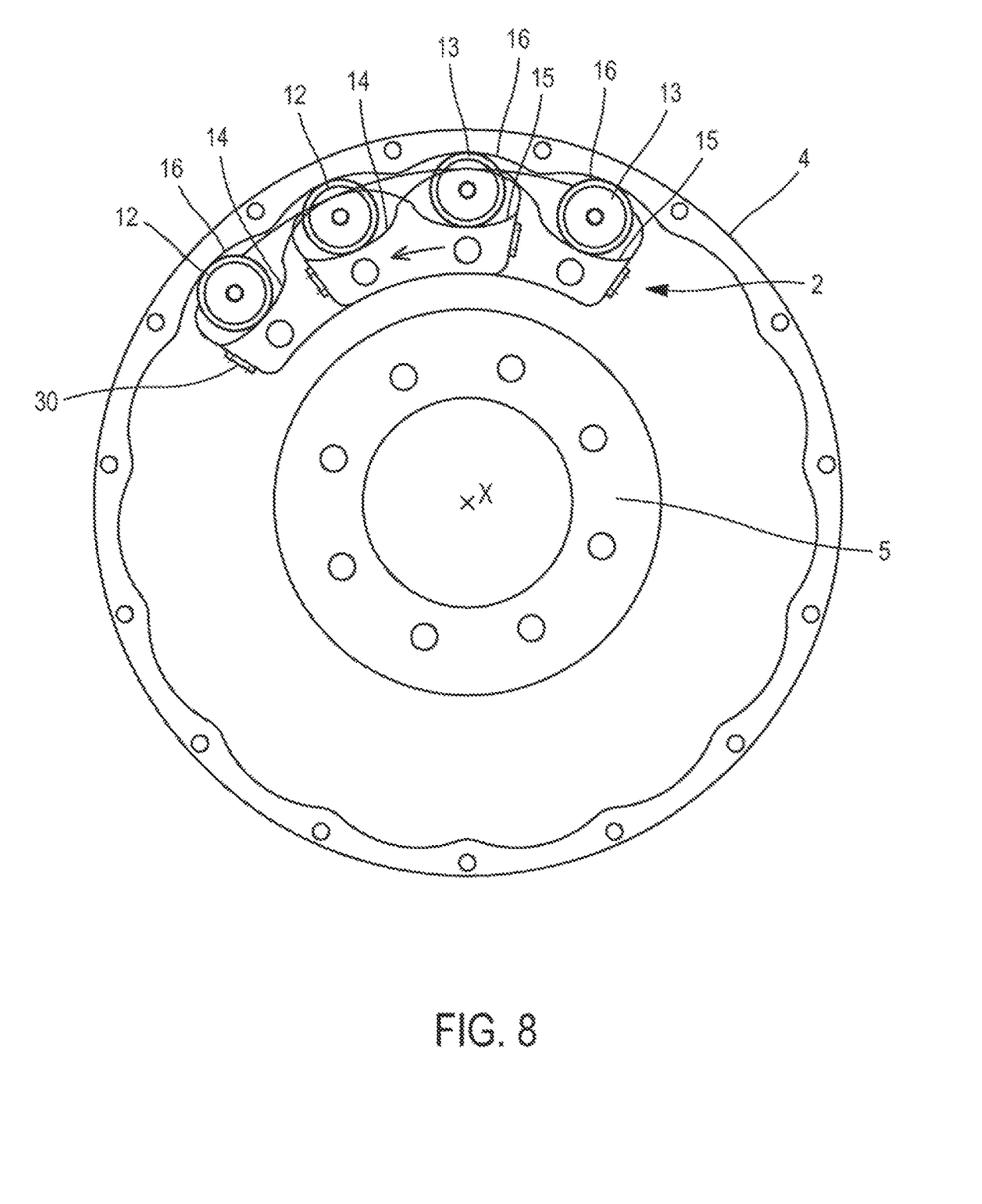
FIG. 8 is a frontal view of the damping system, schematically illustrating three successive positions of the same pendulum flyweight with respect to the support member.

As depicted in particular in FIG. 2, outer raceways 16 are juxtaposed one after another continuously around axis X. Cylindrical rollers 12, 13 are thus each capable of passing freely from one of outer raceways 16 to another adjacent outer raceway 16. When pendulum flyweights 2 are acted upon by high-amplitude vibrations causing saturation of the pendulum oscillator, the vibrations thus result in a deflection of pendulum flyweights 2 such that the rolling bodies are displaced beyond the end of the outer raceway 15 with which they were previously interacting, and change to another outer raceway 16. FIG. 8 schematically illustrates three successive positions of a pendulum flyweight 2 when each of the associated cylindrical rollers 12, 13 has changed to another outer raceway 16 twice. The angular deflection of pendulum flyweights 2 with respect to support 1 is therefore not limited by any abutment element.

Outer raceways 16 can be produced by casting or by machining. Outer raceways 16 can be produced in particular by stamping, milling, or any other appropriate machining means.

In the embodiment depicted, support member 1 has more outer raceways than the damping system has cylindrical rollers 12, 13. Specifically, support member 1 has three outer raceways 16 per pendulum flyweight 2. As explained previously, however, since the geometry of the raceways is determined as a function of the desired tuning order, the number of outer raceways per pendulum flyweight 2 is determined in particular as a function of the tuning order of the outer raceways. As an example, the support member can thus have in particular, for each pendulum flyweight, two outer raceways for pendulum flyweights tuned to order 1.5, three outer raceways for pendulum flyweights tuned to order 2, or four outer raceways for pendulum flyweights tuned to order 4.

Note that the angular sum of the intervals between pendulum flyweights 2 is less than the angular distance of one outer raceway 16. The "angular distance" of an outer raceway 16 is understood here as the angle formed between a line passing through axis X and a first end of an outer raceway, and a line passing through axis X and the second end of said outer raceway. A change of outer raceway 16 on the part of cylindrical rollers 12, 13 of one of pendulum flyweights 2 thus results in a change of outer raceway 16 on the part of cylindrical rollers 12, 13 of the other pendulum flyweights 2, so that a balanced distribution of pendulum flyweights 2 around axis X can be ensured.

Figure 6:
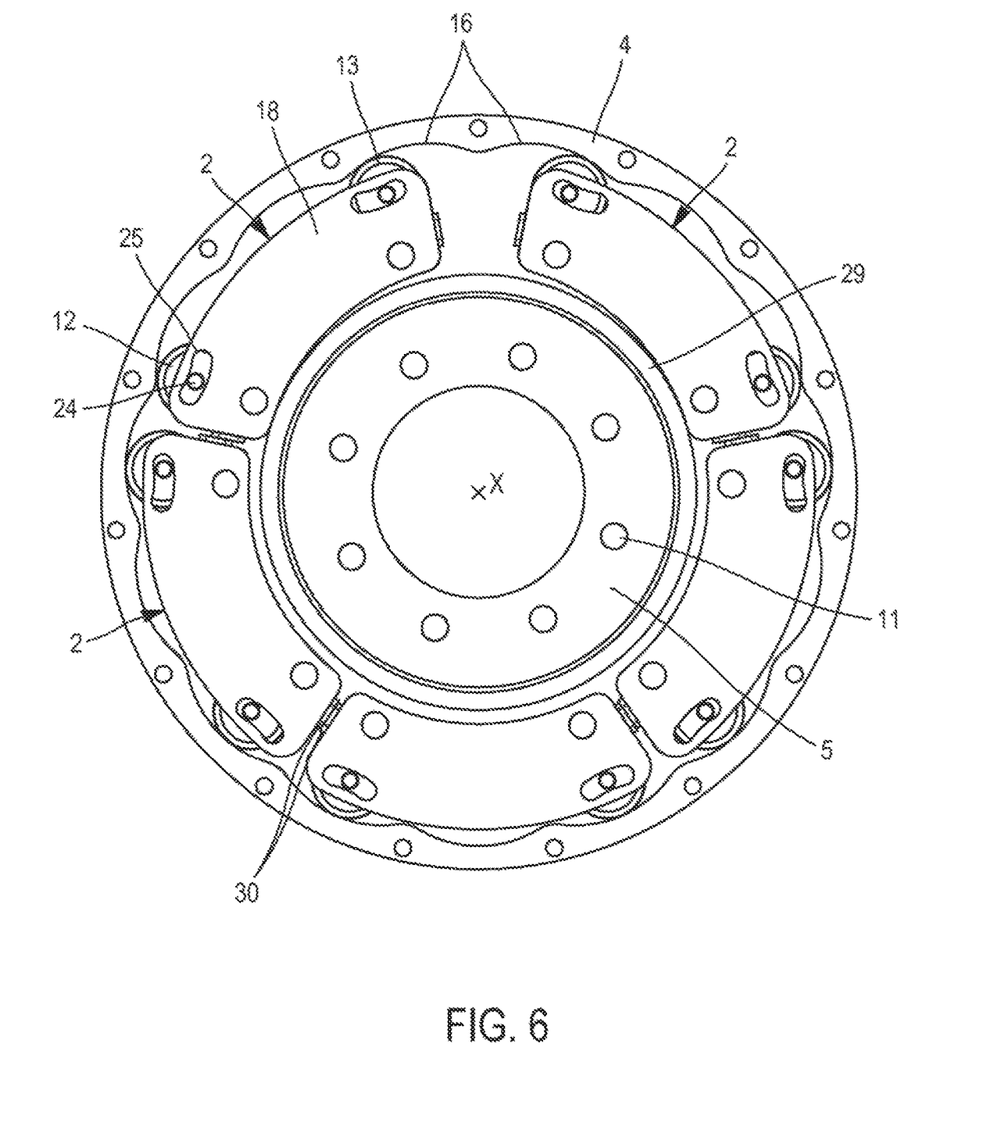
FIGS. 6 and 7 are frontal views of the damping system, depicting the pendulum weights when the engine is stopped and the pendulum flyweights are therefore no longer subjected to centrifugal force.
Figure 7:
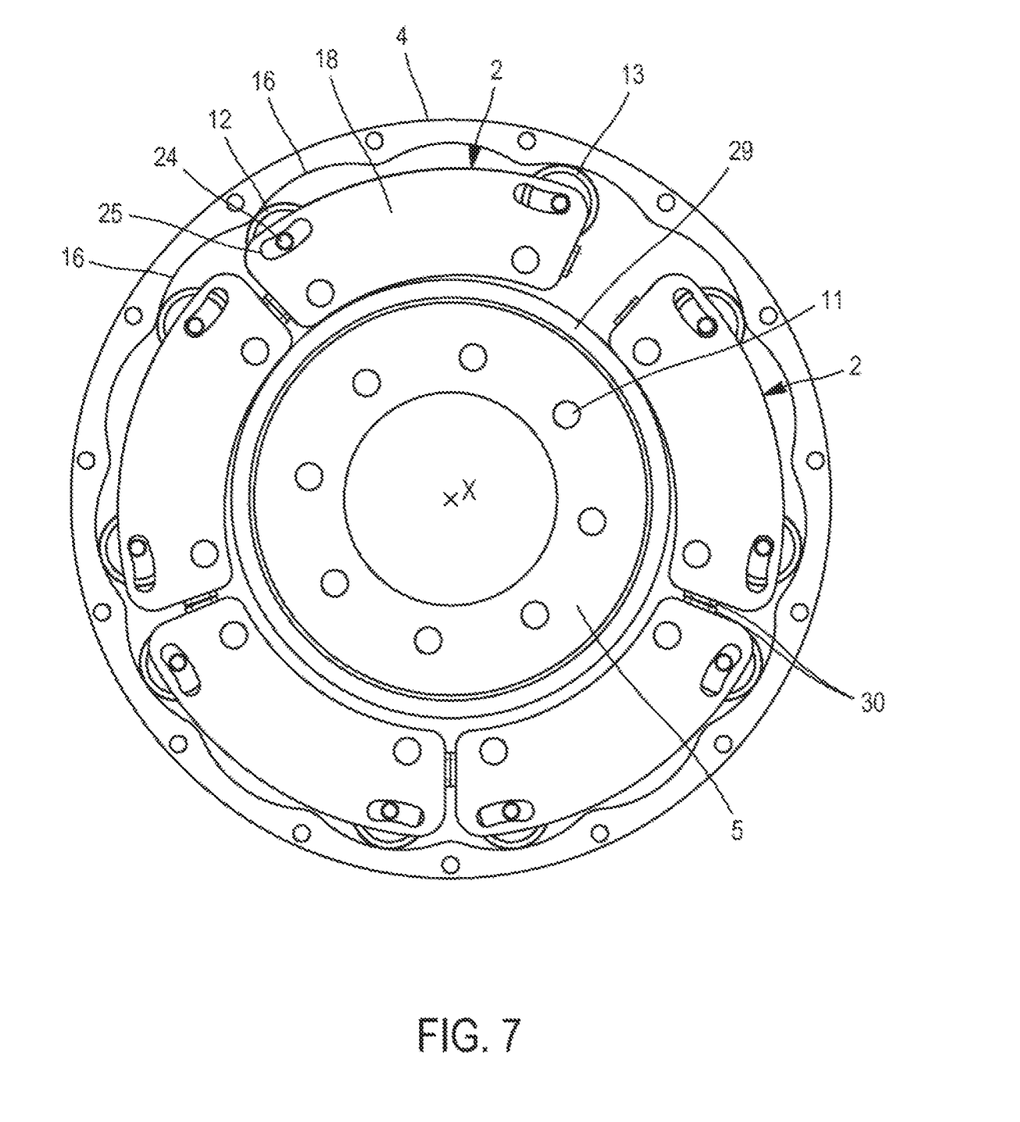

Support member 1 furthermore has an element allowing damping of the fall of pendulum flyweights 2 with respect to support member 1 when pendulum flyweights 2 are no longer subjected to centrifugal force. In the embodiment depicted, in FIGS. 2 and 7 a ring 29 made of elastomeric material covers internal ring 5 and thus allows noise to be limited when pendulum flyweights 2 drop back in response to gravity. A configuration of this kind in which pendulum flyweights 2 are no longer subjected to centrifugal force is illustrated in particular in FIGS. 6 and 7.

According to another embodiment, internal ring 5 can be produced directly from elastomer in order to damp the fall of pendulum flyweights 2 upon an engine stoppage.

Pendulum flyweights 2 also have, at their circumferential ends, abutment elements 30 made of elastomer that allow damping of impacts and limitation of noise between two adjacent pendulum flyweights 2 upon an engine stoppage or in operating conditions in which the deflections of pendulum flyweights 2 are out of phase.

In the embodiment depicted, each of the two circumferential ends of each of pendulum flyweights 2 is equipped with an abutment element 30 made of elastomer. In another embodiment, however (not depicted), only one of the facing ends of two adjacent pendulum flyweights is equipped with an abutment element 30 made of elastomer.

Use of the verb "have," "comprise" or "include" and of conjugated forms thereof does not exclude the presence of elements or steps other than those recited in a claim.

In the claims, no reference character in parentheses shall be interpreted as a limitation of the claim.

The invention claimed is:

1. A vibration damping system for a motor vehicle transmission, the vibration damping system comprising:
    a support member (1) configured to be driven rotationally around an axis (X), the support member (1) having a plurality of outer raceways (16); and
    a plurality of pendulum flyweights (2) distributed circumferentially around the axis (X), each of the pendulum flyweights (2) having two inner raceways (14, 15) radially internal with respect to the outer raceways (16);
    each of the pendulum flyweights (2) being mounted oscillatingly with respect to the support member (1) by two rolling bodies (12, 13) independently from the other pendulum flyweights (2);
    each of the two rolling bodies (12, 13) interacts with one of the two inner raceways (14, 15) of one of the pendulum flyweights (2) and with one of the outer raceways (16) of the support member (1) in order to guide the oscillating movement of one of the pendulum flyweights (2) with respect to the support member (1);
    the outer raceways (16) are juxtaposed one after another continuously around the axis (X) so that each of the rolling bodies (12, 13) is configured to pass freely from a first outer raceway (16) to a second outer raceway (16) adjacent to the first outer raceway (16) when the pendulum flyweights (2) are acted upon by vibrations having an amplitude such that each of the rolling bodies (12, 13) of each of the pendulum flyweights (2) is displaced beyond an end of the first outer raceway (16).

2. The vibration damping system according to claim 1, wherein the two rolling bodies (12, 13) associated with each of the pendulum flyweights (2) are held on the associated pendulum flyweight (2).

3. The vibration damping system according to claim 2, wherein the support member (1) has an external ring (4) and an internal ring (5) which are concentric and coaxial with the axis (X) and between which the pendulum flyweights (2) extend radially; and wherein the outer raceways (16) are configured in an internal surface of the external ring (4).

4. The vibration damping system according to claim 2, herein the rolling bodies are cylindrical rollers (12, 13), each having at least one end equipped with an axially projecting pin (24), wherein each of the pendulum flyweights (2) has at least one flange (18, 19) axially bordering the inner raceways (14, 15) of each of the pendulum flyweights (2), and wherein the at least one flange (18, 19) is equipped with two grooves (25) each receiving one of the pins (24).

5. The vibration damping system according to claim 4, wherein the support member (1) has an external ring (4) and an internal ring (5) which are concentric and coaxial with the axis (X) and between which the pendulum flyweights (2) extend radially; and wherein the outer raceways (16) are configured in an internal surface of the external ring (4).

6. The vibration damping system according to claim 4, wherein each of the cylindrical rollers (12, 13) has two ends each equipped with an axially projecting pin (24), wherein each pendulum flyweight (2) has two flanges (18, 19) arranged on axially opposite sides of the inner raceways (14, 15) of the pendulum flyweight (2), and wherein each of the two flanges (18, 19) is equipped with the two grooves (25) each receiving one of the pins (24).

7. The vibration damping system according to claim 6, wherein a functional clearance is provided between each pin (24) and the edges of the groove (25) in which the pin (24) is received, the functional clearance being configured such that the pin (24) does not touch the edges of the groove (25) when the cylindrical roller (12, 13) equipped with the pin interacts with the inner raceway (16) and the outer raceway (16).

8. The vibration damping system according to claim 4, wherein a functional clearance is provided between each of the pins (24) and edges of the groove (25) in which the pin (24) is received, and wherein the functional clearance is configured such that the pin (24) does not touch the edges of the groove (25) when the cylindrical roller (12, 13) equipped with the pin interacts with the inner raceway (14, 15) and the outer raceway (16).

9. The vibration damping system according to claim 6, wherein the support member (1) has an external ring (4) and an internal ring (5) which are concentric and coaxial with the axis (X) and between which the pendulum flyweights (2) extend radially; and wherein the outer raceways (16) are configured in an internal surface of the external ring (4).

10. The vibration damping system according to claim 8, wherein the support member (1) has an external ring (4) and an internal ring (5) which are concentric and coaxial with the axis (X) and between which the pendulum flyweights (2) extend radially; and wherein the outer raceways (16) are configured in an internal surface of the external ring (4).

11. The vibration damping system according to claim 1, wherein the support member (1) has an external ring (4) and an internal ring (5) which are concentric and coaxial with the axis (X) and between which the pendulum flyweights (2) extend radially; and wherein the outer raceways (16) are configured in an internal surface of the external ring (4).

12. The vibration damping system according to claim 11, wherein the internal ring (5) is covered with a ring (29) of elastomeric material in order to damp the fall of the pendulum flyweights (2) when the pendulum flyweights (2) are no longer subjected to a centrifugal force.

13. The vibration damping system according to claim 11, wherein the support member (10) furthermore has two discs (6, 7) arranged on axially opposite sides of the internal ring (5) and external ring (4).

14. The vibration damping system according to claim 13, further comprising axial retention members (26) fastened to the pendulum flyweights (2) and arranged on axially opposite sides of the pendulum flyweights (2), wherein each of the axial retention members (26) is interposed between one of the pendulum flyweights (2) and one of the discs (6, 7) of the support member (1) in order to axially center the pendulum flyweights (2) with respect to the support member (1).

15. The vibration damping system according to claim 1, wherein each of the pendulum flyweights (2) has two circumferential ends equipped with an abutment element (30) made of elastomer.

16. The vibration damping system according to claim 1, wherein the support member (1) has at least as many outer raceways (16) as the rolling bodies (12, 13) of the damping system.

17. The vibration damping system according to claim 6, wherein the support member has three or four outer raceways (16) per one of the pendulum flyweights (2).

18. The vibration damping system according to claim 1, wherein the outer raceways (16) exhibit a concavity directed outward, and wherein the inner raceways (14, 15) exhibit a concavity directed inward.

19. The vibration damping system according to claim 1, wherein an angular sum of intervals between the pendulum flyweights (2) is less than an angular distance of one of the outer raceways (16).

20. A motor vehicle having the vibration damping system according to claim 1.

21. The vibration damping system according to claim 1, wherein each of the pendulum flyweights (2) has a central element (17) and two flanges (18, 19) arranged on axially opposite sides of central element (17) to ensure integration of the two rolling bodies (12, 13) with the respective pendulum flyweight (2).

22. A vibration damping system for a motor vehicle transmission, the vibration damping system comprising:
- a support member (1) configured to be driven rotationally around an axis (X), the support member (1) having a plurality of outer raceways (16); and
- a plurality of pendulum flyweights (2) distributed circumferentially around the axis (X), each of the pendulum flyweights (2) having two inner raceways (14, 15) radially internal with respect to the outer raceways (16);
- each of the pendulum flyweights (2) being mounted oscillatingly with respect to the support member (1) by two rolling bodies (12, 13);
- each of the two rolling bodies (12, 13) interacts with one of the two inner raceways (14, 15) of one of the pendulum flyweights (2) and with one of the outer raceways (16) of the support member (1) in order to guide the oscillating movement of one of the pendulum flyweights (2) with respect to the support member (1);
- the outer raceways (16) are juxtaposed one after another continuously around the axis (X) so that each of the rolling bodies (12, 13) is configured to pass freely from a first outer raceway (16) to a second outer raceway (16) adjacent to the first outer raceway (16) when the pendulum flyweights (2) are acted upon by vibrations having an amplitude such that of the rolling bodies (12, 13) of each of the pendulum flyweights (2) is displaced beyond an end of the first outer raceway (16);
- each of the pendulum flyweights (2) having a central element (17) and two flanges (18, 19) arranged on axially opposite sides of central element (17);
- the inner raceways (14, 15) formed on an external periphery of the central element (17).

* * * * *